US008639587B1

(12) United States Patent
Whang

(10) Patent No.: US 8,639,587 B1
(45) Date of Patent: Jan. 28, 2014

(54) METHOD, MEDIUM, AND SYSTEM FOR SECURE DIRECT PURCHASE

(71) Applicant: Google Inc., Mountain View, CA (US)

(72) Inventor: Daniel Whang, Dublin, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/831,051

(22) Filed: Mar. 14, 2013

(51) Int. Cl.
*G06Q 30/00* (2012.01)

(52) U.S. Cl.
USPC ............................................. 705/26.5

(58) Field of Classification Search
USPC ........................ 705/26.1, 27.1, 26.5
See application file for complete search history.

(56) References Cited

U.S. PATENT DOCUMENTS

| | | | |
|---|---|---|---|
| 2008/0046338 A1* | 2/2008 | Tarvydas et al. | 705/26 |
| 2008/0270246 A1* | 10/2008 | Chen | 705/17 |
| 2009/0144194 A1* | 6/2009 | Dickelman | 705/39 |
| 2011/0276418 A1* | 11/2011 | Velani | 705/16 |

OTHER PUBLICATIONS

OMahony, Donal, Michael Peirce, and Hitesh Tewari. "7 Electronic Payment Systems." (1997).*

* cited by examiner

*Primary Examiner* — Matthew Zimmerman
(74) *Attorney, Agent, or Firm* — Johnson, Marcou & Isaacs, LLC

(57) ABSTRACT

A user and a merchant register an account with a payment processing system and each receive a unique identifier. When the registered user enters a search query for a product, the search engine system locates a product that matches the search query and that is associated with a registered merchant. The search engine system then confirms that the user and the merchant are registered, and creates a unique product identifier for the product. After associating the unique product identifier with the product, the search engine presents the product to the user with a direct purchase option. If the user selects a direct purchase option, the search engine system communicates with the payment processing system and merchant system to facilitate and verify the purchase transaction. The merchant then provides the product to the user.

22 Claims, 8 Drawing Sheets

METHOD, MEDIUM, AND SYSTEM FOR SECURE DIRECT PURCHASE

TECHNICAL FIELD

The present disclosure relates generally to online transactions and, more particularly, to a direct product purchase option that is presented in a search engine results page.

BACKGROUND

In a conventional online product search and purchase transaction, a consumer enters a product search term on a search engine. The search engine then returns results for the product, usually along with links to particular merchants that sell the product. The search engine may also return merchant advertisements related to the product.

By clicking on a link or merchant advertisement, the consumer is redirected to the merchant's website. There, the consumer must typically browse various products on the merchant's website to identify the specific product of interest. Once that product is identified, the consumer oftentimes must navigate to an additional merchant webpage that is specific to the product.

If the consumer desires to purchase the product, additional browsing is usually necessary. For instance, the consumer must indicate their desire to purchase the product, such as by accessing a link on the merchant's webpage specific for the product. Thereafter, the consumer may be redirected to a payment processing page, where they must enter their unique consumer credentials such as their billing address, shipping address, and payment account information. Hence, by the time a conventional product search and purchase transaction is complete, a consumer will have navigated through numerous merchant webpages. The consumer will have also participated in several consumer-driven decisions, such as which links or advertisements to select from the search engine product search results page, or which specific product to select from the merchant's website offering numerous products to select from. All of these activities—navigating numerous webpages and making decisions about products of interest—can be burdensome to a consumer. As such, the conventional product search and purchase transaction often hinders consumer convenience as well as consumer impulse buying.

SUMMARY

One aspect of the example embodiments described herein provides a computer-implemented method for direct purchasing. A search engine system receives a search query for a product from a computing device associated with a user. The search engine system then identifies a product that matches the search query, associates a unique product result identifier with a direct purchase option control for the identified product, and presents the direct purchase option control associated with the unique product result identifier on the user computing device. The search engine system presents the direct purchase option control on a search results screen comprising information regarding the identified product. When the search engine system receives an input from the user computing device of a selection of the direct purchase option control for the product, a payment processing system automatically completes a purchase of the product on behalf of the user. The payment processing system automatically completes the purchase in response to the search engine system receiving the input from the user computing device of the selection of the direct purchase option control for the product.

In another aspect of the example embodiments described herein, a search engine system receives a search query for a product from a computing device associated with a user. Based on the search query, the search engine system identifies a first product and a second product that matches the search query, associates a first unique product result identifier with a direct purchase option control for the first identified product, and associates a second unique product result identifier with a direct purchase option control for the second identified product. The search engine system then presents the first direct purchase option control associated with the first unique product result identifier and the second direct purchase option control associated with the second unique product result identifier on the user computing device. The search engine system presents the first and second direct purchase option controls on a search results screen comprising information regarding the first and second identified products. The search engine system then receives an input from the user computing device of a selection on the user computing device of the first direct purchase option control for the first product. Based on the selection, a payment processing system automatically completes a purchase of the first product on behalf of the user in response to the search engine system receiving the input from the user computing device of the selection on the user computing device of the first direct purchase option control for the first product.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
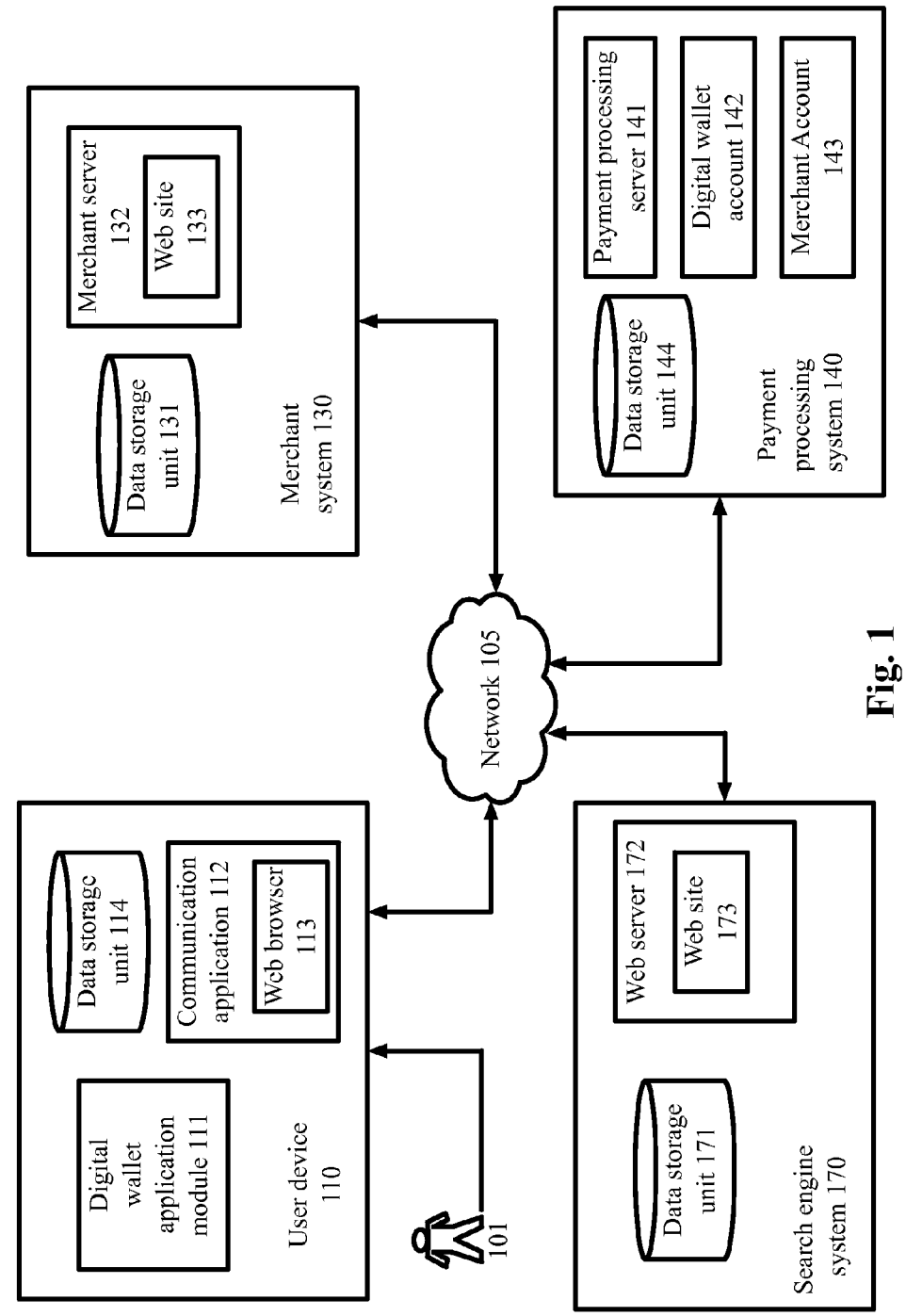
FIG. 1 is a block diagram depicting a system for providing a secure, direct product purchase option with search engine results, in accordance with certain example embodiments.

Embodiments herein provide computer-implemented techniques for providing a secure, direct product purchase option with search engine results. Generally, a user and a merchant establish an account with a payment processing system. As part of the registration, the merchant and user each receive a unique identifier. When the registered user enters a search query for a product, the search engine system locates products associated with the registered merchant. The search engine presents that product to the user with a direct purchase option in the search engine results page or screen. If the user selects the direct purchase option, the search engine system communicates with the payment processing system and merchant system to verify the purchase and to complete the purchase between the merchant and the user.

In certain example embodiments, user makes a request, for example, to create a digital account with a payment processing system, such as a digital wallet account. The payment processing system receives the user request to create the digital wallet account. The payment processing system then creates the account with the user credentials, including, for example, the user's name, billing address, shipping address, and payment instrument information. The payment processing system also creates a user identifier that is unique to the user and that is associated with the digital wallet account. The payment processing system also creates or associates with the digital wallet account a user login name and user password so that the user may access the digital wallet account, for example. In an example embodiment, the user can access the digital wallet account by logging onto the payment processing system website online, using a digital wallet application module on a user mobile communication device, such as a user computing device, or by using any other suitable user interface system.

The payment processing system also receives a request, for example, from a merchant to create a merchant account. The merchant account includes the merchant's credentials, such as the merchant's address, billing address, and payment address. The merchant may also, in some embodiments, provide information regarding the product(s) it sells. As part of the registration process, the payment processing system also creates a merchant identifier that is unique to the particular merchant. The payment processing system may also provide the merchant with a merchant login name and password (each possibly selected by the merchant) so that the merchant can access its account. In an example embodiment, the merchant can access the merchant account by logging onto the payment processing system website online by using a suitable merchant interface system.

In one exemplary embodiment, the user enters a search query for a product using a web browser associated with the user device. A search engine system receives the user's product query and then locates one or more products, for example, matching the user's search query. The search engine system also determines if the user is a user that is registered with the payment processing system. For example, the search engine system receives the user identifier from the user digital wallet account login. The search engine system communicates the user identifier to the payment processing system, which verifies that the user identifier from the search engine system matches the user identifier stored in the user's digital wallet account. If there is not a match, the payment processing system notifies the search engine system that the user is not a registered user, and the search engine system returns conventional search results with the search results pages. If the match is verified, the payment processing system notifies the search engine system that the user is a registered user.

The search engine system also determines if the merchant providing the product is a registered merchant. For example, the search engine system reads the merchant identifier associated with the product, and then it communicates the merchant identifier to the payment processing system. The payment processing system matches the merchant identifier from the search engine with the merchant identifier stored with the merchant's payment processing system account. If there is not a match, the payment processing system notifies the search engine system that the merchant is not a registered merchant, and the search engine system returns conventional search results with the search results pages. If the match is verified, the payment processing system notifies the search engine system that the merchant is registered.

After the search engines system determines that the user and merchant are registered, the search engine system creates a unique product result identifier for the product. The search engine system then links the unique product identifier to a direct purchase option control for a user interface. The search engine system then presents the direct purchase option with the search results to the user on the user device. In an example embodiment, the direct purchase option may be a control button, such as an "instant buy" or "buy now" button that the user may select. In certain example embodiments, the search engine system presents a plurality of direct purchase options with the search results to the user on the user device, with each option, for example, being associated with one or more different merchants. The user may select a direct purchase option, for example, by clicking on the control button.

If the user selects the direct purchase option, the search engine system receives the user's direct purchase option selection from the user. In one exemplary embodiment, the search engine system may provide the user with a confirmation control button, such as a "confirm" button, so that that the user may confirm the product selection, for example. After the search engine receives either the direct purchase selection from the user or the confirmation of the user's selection in accordance with certain example embodiments, the search engine system communicates the user identifier and the product result identifier to the payment processing system. The payment processing system identifies the user's account based on the user identifier and links the product result identifier with the user's account, for example, by storing the product result identifier in the user's account record.

The search engine system also communicates the user identifier and the product result identifier to the merchant system. In turn, the merchant system communicates the user identifier and the product result identifier to the payment processing system. The payment processing system then verifies that the merchant-received product result identifier and user identifier match the information stored in the user's account for the product, which was received from the search engine system. If the information does not match, then the payment processing system notifies the search engine system of the failed transaction, and, in an exemplary embodiment, the payment processing system also may notify the merchant of the failed transaction. The search engine system ends the transaction and notifies the user of the failed transaction.

If the payment processing system verifies that the merchant-received product result identifier and user identifier match the information stored in the user's account for the product, which was received from the search engine system, then the payment processing system facilitates payment from the user to the merchant. In one example embodiment, the payment processing system processes payment to the merchant for the product. For example, the payment processing system receives confirmation from the merchant to charge the user's digital wallet account for the product. The payment processing then attempts to charge a payment account associated with the user's digital wallet account for the product. If the payment transaction is not successful, then the payment processing system notifies the search engine system of the failed transaction, and the search engine notifies the user that the transaction was not successful. The payment system may also notify the merchant system of the failed transaction.

If the payment transaction was successful, the payment processing system receives confirmation, such as from the issuer of the payment account, that the payment transaction was complete and that the payment account was charged for the product. The payment processing system then provides payment to the merchant. The payment processing system also provides the merchant with the user's name and shipping information and notifies the search engine system of the successful transaction.

In an alternative example embodiment, the merchant system processes payment for the product. For example, the payment processing system may provide the user's payment account information to the merchant system, along with the user's name and shipping address. Additionally or alternatively, in certain example embodiments, the merchant system can obtain the shipping and payment information for the user from the unique user identifier and the unique product identifier. The merchant system then attempts to charge the user's payment account for the product. The merchant system then notifies the payment processing system of whether the payment transaction attempt was successful. If the payment processing system receives notice from the merchant system that the payment transaction was not successful, the payment processing system notifies the search engine system of the failed transaction. The search engine system then notifies the user of the failed payment transaction attempt. Alternatively, if the payment processing system receives notice that the payment transaction was successful, it notifies the search engine system of the successful transaction. The merchant system also may notify the search engine system of the failure or success of the payment transaction.

After the search engine system receives notification that the payment transaction was successful, the search engine system notifies the user of the successful transaction. In certain example embodiments, the search engine system may provide the notification of the successful transaction on the search results page. For example, the search engine system may provide a "paid" button or icon on the search results page or screen so that the user will know that the transaction is complete and that the payment account associated with the user's digital wallet account was charged for the product. In certain example embodiments, the "buy now" button may transition to a "paid" button or other control button to indicate that the purchase transaction was successful. The merchant then provides the product to the user. In some embodiments, the "paid" button cannot be selected by the user (or no action is performed if selected), while in other embodiments, then the "paid" button is selected, the user is taken to a receipt and/or order status page.

Turning now to the drawings, in which like numerals represent like (but not necessarily identical) elements throughout the figures, example embodiments are described in detail.

Example System Architectures

FIG. 1 is a block diagram depicting a system for providing a direct purchase option with search results to a user, in accordance with certain example embodiments. As depicted in FIG. 1, the system 100 includes network devices 110, 130, 140, and 170 that are configured to communicate with one another via one or more networks 105.

Each network 105 includes a wired or wireless telecommunication means by which network devices (including devices 110, 130, 140 and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment. Also, throughout the discussion of the example embodiments, it should be understood that communications transmitted through the network 105 could be encrypted to increase the security of the communication.

Each network device 110, 130, 140 and 170 includes a device having a communication module capable of transmitting and receiving data over the network 105. For example, each network device 110, 130, 140 and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, 140, and 170 are operated by end-users or consumers, merchant operators, proxy card system operators, and payment account system operators, respectively.

The user 101 can use the communication application 112, such as a web browser application 113 or a stand-alone application, to view, search, download, upload, or otherwise access documents or web pages via a distributed network 105. The network 105 includes a wired or wireless telecommunication system or device by which network devices (including devices 110, 130, 140 and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

The communication application 112 can interact with web servers or other computing devices connected to the network 105, including for example the search engine system 170, the web server 172 of the search engine system, the payment processing system 140, and the web server of the payment processing system. The user 101 does not necessarily, for example, receive web pages directly from the merchant website 133.

The user network device 110 includes a digital wallet application module 111. The digital wallet application module 111 may encompass any application, hardware, software, or process the user device 110 may employ to assist the user 101 in completing a purchase. For example, the digital wallet application module 111 can interact with a digital wallet account of a payment processing system. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 also includes a data storage unit 114 accessible by the digital wallet application module 111 and the communication application 112. The example data storage unit 114 can include one or more tangible computer-readable storage devices. The data storage unit 114 can be stored on the user device 110 or can be logically coupled to the user device 110. For example, the data storage unit 114 can include on-board flash memory and/or one or more removable memory cards or removable flash memory.

The user 101 can use the payment processing server 141 of the payment processing system 140 to view, register, download, upload, or otherwise access the payment processing system 140 via the network 105. The user 101 associates one or more registered payment accounts, including bank account debit cards, credit cards, gift cards, loyalty cards, coupons, offers, prepaid offers, peer-to-peer transaction accounts, store rewards cards, or other type of payment account that can be used to make a purchase or redeem value-added services with a digital wallet account 142 of the user 101. The payment processing system 140 also may function as the issuer for the associated financial payment account. The user's registration information is provided to the payment processing system 140 and, in certain embodiments, stored in a digital wallet account 142 of the user. The user 101 also may use the payment processing server 141 to define payment rules for the digital wallet account.

The user device 110 may comprise appropriate technology that includes or is coupled to a web server (for example, Google Chrome, Microsoft Internet Explorer, Netscape, Safari, Firefox, or other suitable application for interacting with web page files).

The merchant system 130 may use a web server 132 to view, download, upload, create offers, sell products online, or otherwise access and communicate with other devices or systems of the network 105, such as the user device 110, a payment processing system 140, and a search engine system 170. For example, the search engine system 170 may, in certain embodiments, access product information from the merchant system 130 via the merchant website 133. The merchant system 130 includes a data storage unit 131. The example data storage unit 131 can include one or more tangible computer-readable storage devices. The data storage unit 131 can be stored on a device of the merchant system 130 or be logically coupled to a device of the merchant system 130. For example, the data storage unit 131 can include on-board flash memory and/or one or more removable memory cards or removable flash memory.

The merchant system 130 represents an entity that offers products for the user 101 to purchase or use. In certain example embodiments, the merchant system 130 includes a point-of-sale ("POS") terminal (not shown). The point-of-sale terminal may be operated by a salesperson that enters purchase data into the point-of-sale terminal to complete a purchase transaction. The merchant system 130 may be a physical location or an online merchant or comprise both a physical location and an online merchant.

The payment processing system 140 is used by the user device 110, the merchant system 130, and the search engine system 170 to conduct a secure financial transaction. The user 101 can use the payment processing server 141 on the payment processing system 140 to view, register, download, upload, or otherwise access the payment processing system 140 via a website (not shown) and a communication network 105. The payment processing server 141 includes, for example, a web server (not shown). The user 101 can configure one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. For example, the user can configure a digital wallet account 142 with the payment processing system 140. In certain example embodiments, the payment processing system 140 may function as the issuer for the user-associated financial account. The user's 101 registration information can be stored in the data storage unit 144 of the payment processing system 140.

The merchant system 130 can also configure one or more registered accounts with a payment account of the user 101. For example, the user can configure a merchant account 143 with the payment processing system 140. The registration information of the merchant system, for example, can be stored in the data storage unit 144 of the payment processing system 140.

The payment processing system 140 includes a data storage unit 144. The example data storage unit 144 can include one or more tangible computer-readable storage devices. The data storage unit 144 can be stored on a device of the payment processing system 140 or be logically coupled to a device of the payment processing system 140. For example, the data storage unit 144 can include on-board flash memory and/or one or more removable memory cards or removable flash memory.

The search engine system 170 includes a data storage unit 171 accessible by a web server 172 and a website. The search engine system 170 can be used to search the Internet for websites and other Internet accessible data for the purpose of product queries, online shopping, or other online searching functions. The search engine system 170 may collect the websites or other online locations of the searched product and display the results to the user as search engine results pages. The search engine system server 172 represents the computer-implemented system that the search engine system 170 employs to perform Internet searches. The search engine system server 172 can include a set of computer-readable program instructions, for example, using JavaScript, that enable the search engine system 170 to interact with the merchant system 130, for example, to search documents, websites, and other data, submit search results and query suggestions, store product databases, and generate equivalent costs. The search engine system website 173 may represent any web-based interface that allows users to interact with the search engine system 170 to enter search queries or data and receive search results. In certain exemplary embodiments, the search engine system 170 can be implemented in a stand-alone configuration in which the user 101 can search multiple merchant online shopping systems 130.

The example data storage unit 171 of the search engine system 170 can include one or more tangible computer-readable storage devices. The data storage unit 171 can be stored on a device of the search engine system 170 or be logically coupled to a device of the search engine system 170. For example, the data storage unit 171 can include on-board flash memory and/or one or more removable memory cards or removable flash memory.

It will be appreciated that the network connections shown are example and other means of establishing a communications link between the computers and devices can be used. Moreover, those having ordinary skill in the art having the benefit of the present disclosure will appreciate that the merchant system 130, payment processing system 140, and the user device 110 illustrated in FIG. 1 can have any of several other suitable computer system configurations. For example, the functions of the search engine system 170 may, in certain example embodiments, be performed through a secure direct purchase application (not shown) on the user device 101, the web browser 113 of the user device, the merchant system 130, and the payment processing system. Also, a user device 110 embodied as a mobile phone or handheld computer may not include all the components described above, for example.

Example Processes

The components of the example operating environment 100 are described hereinafter with reference to the example methods illustrated in FIGS. 2-6.

Figure 2:
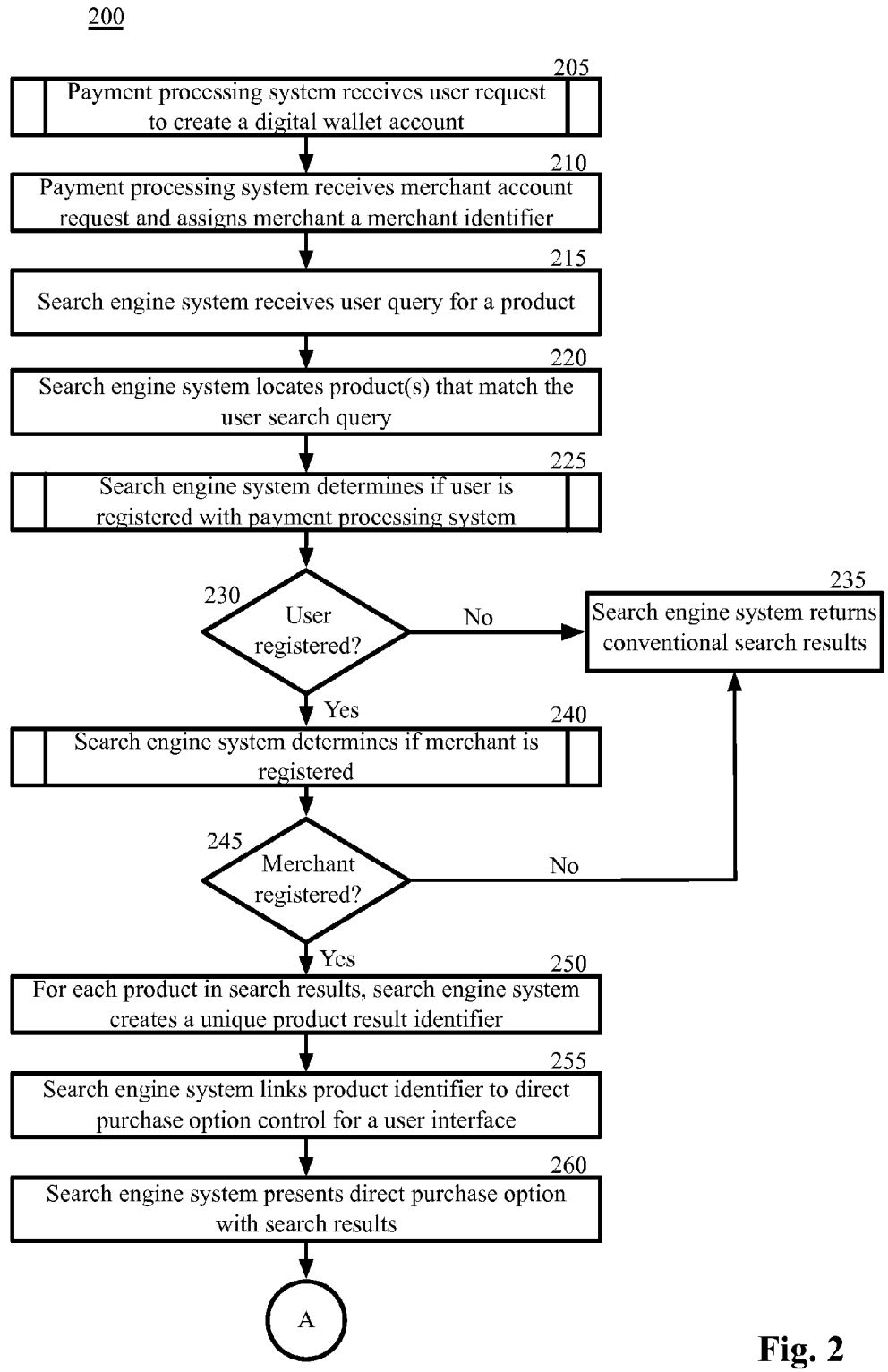
FIGS. 2 and 2A are block flow diagrams depicting a method for purchasing a product directly from a search engine results page, in accordance with certain example embodiments.
Figure 2A:
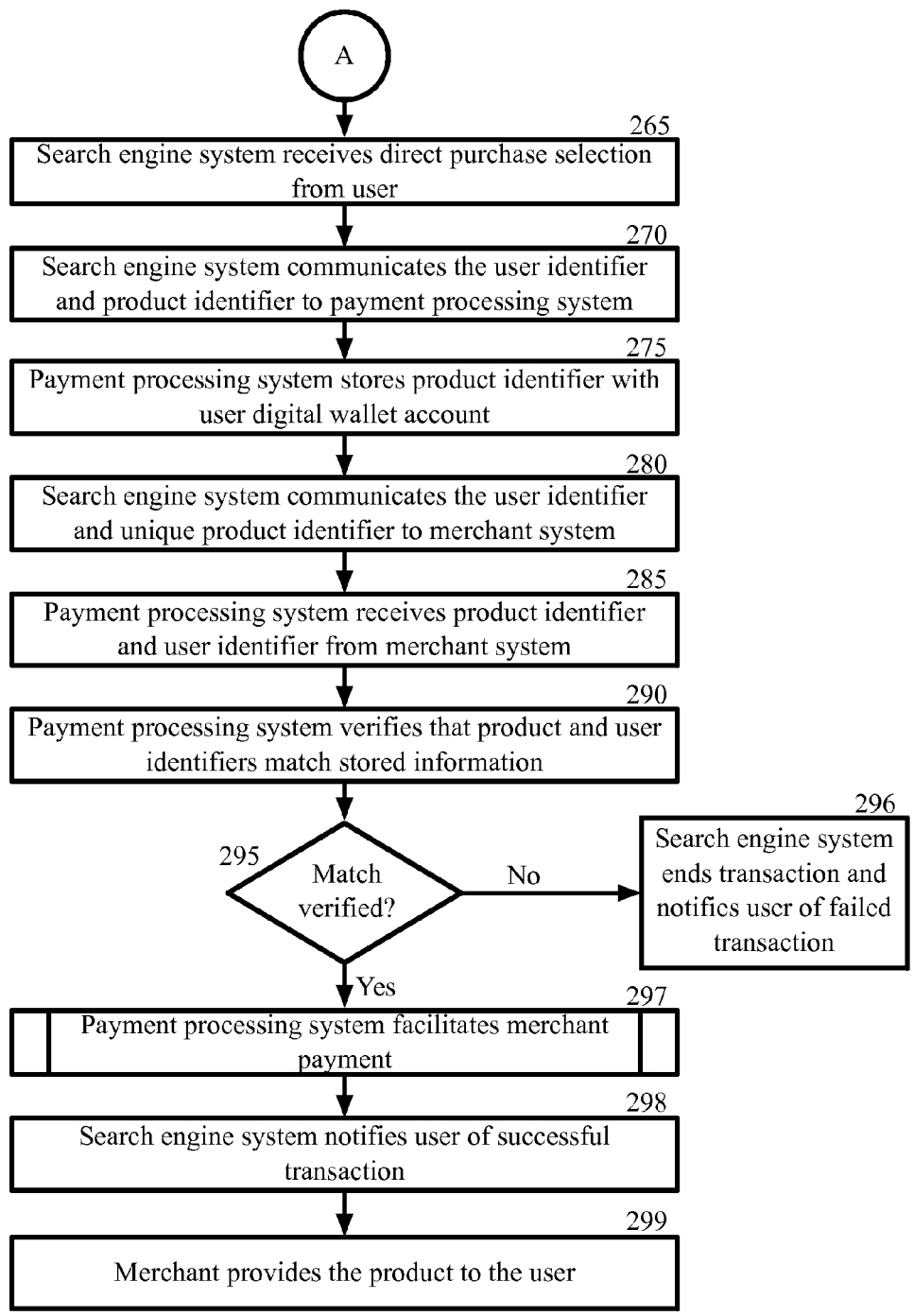

FIGS. 2 and 2A are block flow diagrams depicting a method for purchasing a product directly from a search engine results page, in accordance with certain example embodiments.

With reference to FIGS. 1, 2 and 2A, in block 205, a payment processing system 140 receives a user 101 request to create a digital account such as a digital wallet account 142 with the payment processing system 140. For example, a user device 110 transmits a request to the payment processing system 140 to create the digital wallet account 142 via the network 105. The payment processing system 140 receives the request of the user 101, and creates a digital wallet account 142 for the user 101 using the user's personal credentials. The payment processing system 140 also creates a user identifier that is unique to the user 101 and that is associated with the digital wallet account 142. The details of block 205 are described in further detail below with reference to FIG. 3.

In block 210, the payment processing system 140 receives a merchant account request and assigns the merchant a unique merchant identifier. For example, a merchant system 130 that desires to link one or more of its products to a search engine results page direct purchase option contacts the payment processing system, such as via the network 105. That is, the merchant system 130 provides a request to create a merchant account 143 with the payment processing system 140, and the payment processing system receives the request from the merchant system 130. The payment processing system 140 then creates the merchant account 143, which, for example, allows the merchant system 130 to conduct financial transactions with the payment processing system 140. The payment processing system 140 also assigns the merchant system 130 a merchant identifier that is unique to the merchant system 130. For example, the unique identifier may comprise a software token, such as a shared secret or public-key cryptography token. The payment processing system 140 also associates the unique merchant identifier with each of the one or more products that merchant system 130 offers for sale.

As part of the account registration process, the merchant system 130 may provide the merchant's personal credentials, such as the address, billing address, and payment address of the merchant system 130. The merchant system 130 may also establish rules for processing payment with the payment processing system. The merchant system 130 may also provide, for example, a user name and password for accessing the merchant account 143. The merchant system 130 may, in certain example embodiments, also provide information regarding the product(s) that the merchant system 130 offers for sale. In certain embodiments, the payment processing system 140 provides the merchant system with an application programming interface ("API") so that the merchant system 130 may communicate with the payment processing system 140 and, additionally or alternatively, communicate with the search engine system 170. For example, an application programming interface may, in certain embodiments, allow the search engine system 170 to locate products on the merchant server 132 via the web site 133 of the merchant system. The application programming interface may also allow the merchant system 130 to provide product information to the search engine system 170, thus permitting the search engine system to store product information from the merchant system on the data storage unit 171 of the search engine system. In certain example embodiments, the merchant system 130 can upload inventor information directly to the search engine system 170 via the network 105 and the web server 173 of the search engine system 170.

In block 215, the search engine system 170 receives a user 101 query for a product from a user device 110. For example, a user 101 utilizes a user interface of the website 173 to enter a keyword or phrase relating to the item for which user 101 is searching. The keywords may be a single word relating to the product for which the user would like to purchase, two or more related words, or a phrase relating to the product. As used throughout the specification, any combination of one or more keywords or phrases will be referred to simply as "keywords". The user 101 may enter further details about a product to identify the product such as a model number, part number, or other description. The user 101 then submits the search query to the search engine system 170, and the search engine system 170 receives the search query for the product.

In block 220, the search engine system 170 locates one or more products that match the user's search query for the product. For example, the search engine system 170 identifies one or more search results matching the user's query. The search engine system 170 then extracts from the search results one or more specific products that match the user's search query. In certain embodiments, the search results are based on product information stored in the data storage unit 171 of the search engine system 170. If the merchant system 130 has provided product information to the search engine system 170, for example, the search engine system may locate search results for one or more products matching the search query of the user 101 based on that product information. Alternatively or additionally, in certain example the search engine system 170 may rely on a web crawler to locate search results for one or more products matching the user's search query. For example, the search engine system 170 may access the web site 133 of the merchant system 130 to locate search results for one or more products that match the user's search query. In certain embodiments, the search engine system 170 can gather details about a product as part of the search, such as product attributes including available product sizes, shapes, colors, patterns, fits, material, and/or other attributes or any other type of information relevant to the particular product. Such product attributes may include, for example, any features that affect the product's appeal or acceptance to the user.

In block 225, the search engine system 170 determines if the user 101 is registered with the payment processing system 140. For example, the search engine system 170 receives the unique user identifier from the user device 110, and then verifies, based on the unique user identifier, that the user 101 is registered to use the digital wallet account 142 of the payment processing system 140. In certain example embodiments, the search engine may store the unique user identifier in the data storage unit 171 of the search engine system 170. The details of block 225 are described in further detail below with reference to FIG. 4.

If the search engine system 170 determines that the user 101 is registered with the payment processing system 140, the method follows the "YES" branch of block 230 to block 240. If the search engine system 170 determines that the user 101 is not registered with the payment processing system 140, the method follows the "NO" branch of block 230 to block 235.

In block 235, after the search engine system 170 has determined that the user 101 is not registered with the payment processing system 140, the search engine system returns conventional search results to the user 101. For example, because the user 101 is not a user that is registered with the payment processing system 140, the search engine does not return a direct purchase option with the search results pages as described below. Instead, the search engine system 170 returns search engine results pages that include information normally included in search engine results pages, such as a list of products with titles, a reference to the full version, and a short description showing where the Keywords have matched content within the page, for example.

In block 240, the search engine system 170 determines if a merchant offering the one or more products for sale is registered with the payment processing system 140. For example, if the search engine system 170 locates a product associated with a unique merchant identifier, the search engine system 170 reads the unique merchant identifier associated with the product. The search engine system 170 then presents the merchant identifier to the payment processing system 140 for verification of whether the merchant system 130 is registered. The details of block 240 are described in further detail below with reference to FIG. 5.

If the merchant is not registered with the payment processing system 140, then the method follows the "NO" branch of block 245 to block 235 (discussed above), whereby the search engine system 170 returns conventional search results to the user 101. If the merchant is registered with the payment processing system 140, then the method follows the "YES" branch of block 245 to block 250.

In block 250, for each product in the search results that is associated with a merchant identifier, the search engine system 170 creates a unique product result identifier. For example, the unique product identifier may comprise any information that uniquely identifies a particular product. In certain example embodiments, the unique product identifier may be a product code or other value associated with an individual product. For example, the unique identifier may comprise a Global Trade Item Number (GTIN), such as a UPC, EAN (in Europe), JAN (in Japan), ISBN, and Manufacturer Part Number (MPN). The unique identifier may also comprise or be associated with information regarding the product, such as the price of the product and the merchant that is offering the product. The unique product identifier may also be associated with information regarding available product sizes, colors, or other information or product attributes relevant to a particular product. In certain example embodiments, the unique product result identifier may also contain information specific to the user 101. Thus, when the merchant system 130 receives the unique product identifier as described below, the merchant system 130 can, in certain example embodiments, correlate the selected product with the user 101 based on the specific user 101 information associated with unique product identifier.

In block 255, the search engine system 170 links the unique product identifier to a direct purchase option control for a user interface. For example, the search engine system 170 associates the unique product identifier with a control button option such as an "instant buy," "buy now," "purchase now," or "direct purchase" type option that the search engine system may present to the user 101 on the user device 110. By associating the unique product identifier with the direct purchase option, a selection of the direct purchase option, as described below, indicates a desire of the user 101 to purchase the product associated with the unique product identifier.

In block 260, the search engine system 170 returns a direct purchase option with search results. For example, the search engine system 170 presents a search results page or screen on the user device 110 that includes an option to purchase, directly from the search engine results page, a product that is associated with a unique product. That is, a user 101 may purchase a product matching the user's search query directly from the search results page or screen without having to access additional web pages as part of the transaction. In certain example embodiments, the search engine system 170 presents a search engine results page or screen that, for an identified product, includes a control button such as an "instant buy," "buy now," "purchase now," or "direct purchase" type option to purchase the product. In certain embodiments, the control button may comprise additional information, such as the price of the product selected. By selecting the control button, for example, the user 101 can purchase the item directly from the search engine results pages.

In certain example embodiments, the search engine system 170 may additionally present product attributes that the user 101 may select directly from the search results pages, such as the available product sizes, shapes, colors, patterns, fits, material, and/or other attributes or any other type of information relevant to the particular product. In certain embodiments, such products attributes may be presented in separate fields and/or drop down fields that the user may select. The search engine system may, in certain embodiments, present direct purchase options for multiple products, including products from one or more different merchant systems 130.

The method then follows to block 265 of FIG. 2A. FIG. 2A is a block flow diagram depicting a continuation of the method for purchasing a product directly from a search engine results page, in accordance with certain example embodiments.

In block 265, the search engine system 170 receives a direct purchase selection or input from the user 101. For example, based on the direct purchase option(s) returned with the search engine results pages, the user 101 selects and inputs a direct purchase option from the user interface on the user device 110. That is, in certain example embodiments, the user clicks, taps, or otherwise chooses a direct purchase option. The communication application 112, for example, then communicates the user's direct purchase option selection to the search engine system 170. The search engine system then receives the user's direct purchase selection or input. In certain example embodiments, after the search engine system 170 receives a direct purchase option selection, the search engine system 170 may provide the user 101 with a confirmation control button, such as a "confirm" button, so that that the user may confirm the product selection, for example. For example, the on the search engine results page, the search engine system 170 my transition the direct purchase control button to a "confirm" button. In certain embodiments, the control button may comprise additional information, such as the price of the product selected, as well as the color and size selected. With the selection of a direct purchase option by the user 101, the method automatically completes a purchase of the product on behalf of the user 101 as described herein.

In block 270, the search engine system 170 communicates the user identifier and product identifier to payment processing system. For example, after the search engine system 170 receives direct purchase option from a direct purchase option from the user device 110, the search engine system 170 reads the unique product identifier associated with the direct purchase selection. The search engine system 170 may also, for example, retrieve the unique user identifier from the data storage 171 of the search engine system 170. The search engine system 170 then transmits the unique product identifier and the unique user identifier to the payment processing system via the network 105, for example.

In block 275, the payment processing system 140 stores the product identifier with digital wallet account 142 of the user 101. For example, after the payment processing system receives the unique product identifier and the unique user identifier from the search engine system 170, the payment processing system locates the digital wallet account 142 of the user 101. For example, based on the unique user identifier that the payment processing system 140 receives from the search engine system 170, the payment processing system matches the unique user identifier to the payment processing system 140 to the digital wallet account 142 of the user 101. The payment processing system 140 then associates the unique product identifier with the digital wallet account 142 of the user 101 and hence stores the unique product identifier in the digital wallet account 142 of the user 101. For example, the payment processing system 140 may store the unique product identifier that is associated with the unique user identifier (and hence the user) in the data storage unit 144 of the payment processing system 140.

In block 280, the search engine system 170 communicates the user identifier and unique product identifier to merchant system 130. For example, after the search engine system 170 receives direct purchase option from a direct purchase option from the user device 110, the search engine system 170 reads the unique product identifier associated with the direct purchase selection. The search engine system 170 may also, for example, retrieve the unique user identifier from the data storage 171 of the search engine system 170. The search engine system 170 then transmits the unique product identifier and the unique user identifier to the merchant system 130 via the network 105, for example. Based on the unique product identifier, the merchant system 130, for example, can identify the product. Alternatively or additionally, the search engine system 170 can send product information to the merchant system 130 along with the unique product results identifier. In certain other example embodiments, the merchant system 130 receives the unique product identifier from the payment processing system 140, along with the user 101 credentials for facilitating the transaction.

In block 285, the payment processing system 140 receives the unique product identifier and unique user identifier from merchant system 130. For example, after receiving the unique product identifier and unique user identifier from the search engine system 170, the merchant system transmits the unique product identifier and unique user identifier to the payment processing system 140 over the user network 105. In certain example embodiments, the merchant system may communicate with the payment processing system an application programming interface.

In block 290, the payment processing system 140 verifies that product and user identifiers match stored information. That is, the payment processing system 140 verifies the direct purchase selection of the user 101 against the digital wallet account 142 of the user. For example, based on the unique user identifier that the payment processing system 140 receives from the merchant system 130, the payment processing system 140 compares that unique user identifier with the unique user identifier stored with the digital wallet account 142 of the user 101. Similarly, based on the unique product identifier that the payment processing system 140 receives from the merchant system 130, the payment processing system 140 compares that unique product identifier with the unique product identifier stored with the digital wallet account 142 of the user 101 (i.e., the unique product identifier that the payment processing system 140 received from the search engine system 170 as described with reference to blocks 280 and 285 above). Based on these comparisons, the payment processing system 140 verifies whether the unique user and product identifiers that the payment processing system 140 receives from the merchant system 130 match the unique user and product identifiers associated with the digital wallet account 142 of the user 101.

If the payment processing system 140 verifies the match as described above, the method follows the "YES" branch of block 295 to block 297. If either the unique user identifier or the unique product identifier from the merchant system 130 do not respectively match the unique user identifier or the unique product identifier associated with the payment processing system 140, the method follows the "NO" branch of block 295 to block 296.

In block 296, the search engine system 170 ends the transaction and notifies user 101 of a failed transaction. For example, the payment processing system 140 notifies the search engine system 170 of the failed match. The search engine system 170 then notifies the user 101 of the unsuccessful match. In certain example embodiments, the search engine system may transition the direct purchase control button described above to an "unsuccessful," "purchase failed," or any other button that communicates to the user 101 that the attempted direct purchase option was unsuccessful. For example, by clicking on the "unsuccessful" button on the user interface of the user device 110, the user may, in certain embodiments, be able to access details regarding the failed direct purchase attempt, such as that the user's unique identifier did not match the user identifier stored in the digital wallet account 142 of the user 101. In certain other embodiments, the search engine system 170 may provide the user 101 via a user interface on the user device 110 a control button that allows the user 101 to re-try the direct purchase option, such as a "re-try" or "try again" button. If the user 101 selects the re-try option, for example, the method follows to block 225.

In further example embodiments, the payment processing system 140 may, based on information in the digital wallet account 142 of the user 101, communicate to the user 101 via the user device 110 that an attempt was made to directly purchase a product using the digital wallet account 142 of the user 101. In certain example embodiments, the search engine system 170 or the payment processing system 140 may notify the merchant system 130 of the failed transaction.

In block 297, after the payment processing system 140 has verified that product and user identifiers match stored information as described in block 290 and 295, the payment processing system 140 facilitates payment of the merchant. For example, the payment processing system 140 may charge the digital wallet account 142 of the user 101 and then transmit payment to the merchant system 130. The payment processing system 140 also provides the merchant system 130 with the credentials of the user 101 such as the shipping address of the user. The details of block 297 are described in further detail below with reference to FIG. 6.

In block 298, the search engine system 170 notifies user that the direct purchase option transaction was successful. For example, the payment processing system 140 notifies the search engine system 170 that payment of the merchant system 130 was successful. The search engine system then notifies the user 101 that the direct purchase option transaction was successful. For example, the search engine system 170 may transition the "buy now" or "confirm" buttons to a control button indicating that the transaction was successful, such as a "paid," "transaction complete," or any other button indicating that the transaction was successful. By clicking the successful transaction control button, in certain example embodiments the user 101 may be able to access information regarding the transaction, such as a receipt or confirmation number or other information regarding the price of the product selected, as well as the color and size selected, for example. In certain embodiments, the successful transaction control button may include additional information, such as the price of the product selected, as well as the color and size selected, for example.

Alternatively or additionally, the payment processing system 140 may notify the user 101 that the direction purchase option was successful. For example, based on information in the digital wallet account 142 of the user 101, the payment processing system may contact the user 101 such as by e-mail to notify the user 101 of the successful transaction. In certain embodiments, the payment processing system 140 may provide the user 101 a receipt or confirmation number or other information regarding the price of the product selected, as well as the color and size selected, for example.

In block 299, the merchant system 130 provides the product to the user 101. For example, based on the user credentials including, the name of the user and the shipping address of the user, the merchant system 130 ships the product to the user 101.

Figure 3:
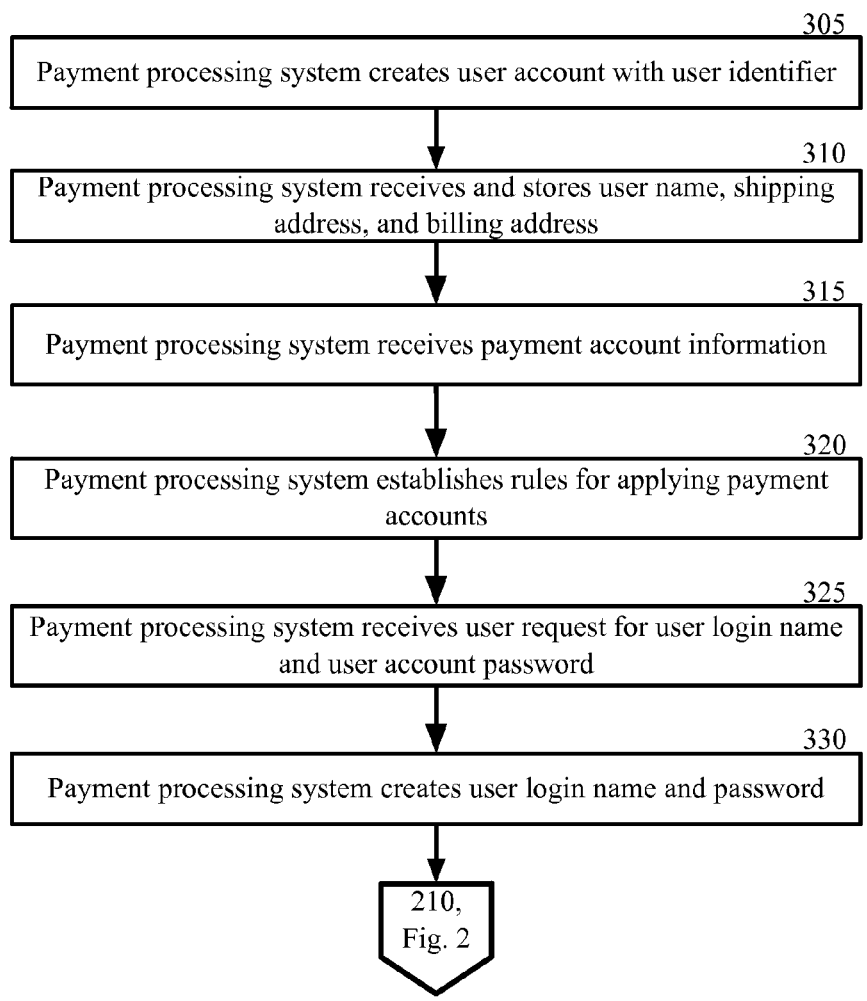
FIG. 3 is a block flow diagram depicting a method for creating a user account, in accordance with certain example embodiments, as referenced in block 205 of FIG. 2.

FIG. 3 is a block flow diagram depicting a method for creating a user account, in accordance with certain example embodiments, as referenced in block 205 of FIG. 2.

With reference to FIGS. 1 and 2, in block 305 of method 205, the payment processing system creates account for a user 101 with a unique identifier for the user 101. For example, the unique user identifier may be implemented, for example, as operating system registry entries, cookies associated with the web browser 113, identifiers associated with hardware of user device 110, or any other appropriate identifiers that uniquely identify the user. In certain example embodiments, the unique user identifier can be a temporary user identification that, for example, changes with each log in of the user 101 so as to increase the security of any financial transactions of the user 101. For example, when the user 101 logs in to the user digital wallet account 142, the payment processing system 140 assigns the user 101 a temporary user identifier that is associated with the digital wallet account 142 of the user 101 and that operates as the unique user identifier described herein. If after a configurable amount of time the payment processing system 140 does not conduct a transaction with the temporary user identifier, the temporary identifier will time-out (expire) and hence no longer be valid. Following creation of the unique user identifier, the payment processing system 140 associates the unique user identifier with the digital wallet application module 111 and, for example, stores the unique user identifier on the data storage unit 114 of the user device 110. The payment processing system 140 can also associate the unique user identifier with the digital wallet account 142 of the user 101 and, for example, store the unique user identifier with the data storage unit 144 of the payment processing system 140.

In block 310, the payment processing system 140 receives and stores the user's name, shipping address, and billing address. For example, when creating a digital wallet account 142, the user 101 enters the user's name, shipping address, and billing address on a user interface of the web browser 113 on the user device 110. The user 101 then communicates the user name, shipping address, and billing address to the payment processing system 140 via the network 105. In certain example embodiments, the payment processing system 140 associates the user name, shipping address, and billing address with the digital wallet account 142 of the user 101 and, for example, stores the user's name, shipping address, and billing address with the data storage unit 144 of the payment processing system 140. The payment processing system 140 can also associate the user's name, shipping address, and billing address with the digital wallet application module 111 and, for example, store the user's name, shipping address, and billing address on the data storage unit 114 of the user device 110.

In block 315, the payment processing system 140 receives payment account information from the user 101. For example, when creating a digital wallet account 142, the user 101 provides the payment account information to the payment processing system 140. The user 101 can associate with the user's digital wallet account 142 multiple debit/credit cards maintained by multiple issuers (including the proxy card system operating as an issuer), stored value cards (for example, gift cards, prepaid cards, re-loadable transaction cards, exchange cards, and other forms of non-credit based value cards), loyalty cards or store rewards cards, value added service accounts (for example, coupons, vouchers for prepaid offers, redemption offers, and other forms of offers), peer-to-peer transaction accounts, bank accounts and/or other forms of financial card accounts. In certain example embodiments, the user 101 may establishes rules with the payment processing system 140 for selecting a payment account in a transaction. For example, the user 101 may use a proxy card application, a web server 141 of the payment processing system 140, or any suitable hardware or software applications to establish rules. The user 101 can select from a selection of rules supplied by the payment processing system 140 or the user 101 can input new rules.

In block 320, the payment processing system 140 establishes rules for applying payment accounts. For example, the payment processing system 140 can establish default payment accounts, make recommendations based on the rules of other users, make a recommendation based on payment account benefits or fees, or establish any other suitable rule or recommendation. The payment processing system 140 may also establish rules based on user 101 input and preferences, such as a preferred payment account. In an example of a rule that can be established by the payment processing system 140 or by the user 101, a particular payment account may be designated as the payment account to be selected for an identified merchant category codes ("MCC") or a group of codes. In another example, a payment account may be designated as the payment account to be selected for an identified merchant. In another example embodiment, the payment processing system 140 may be directed to select the payment account with the lowest balance or the most available credit. Any other suitable rule can be established to select a payment account for a proposed transaction.

In block 325, the payment processing system 140 receives a request from a user 101 for user login name and user account password. For example, the user 101 may select a user name and password and then communicate the user name and password to the payment processing system 140 via the network 105. In an example embodiment, the user 101 can access the digital wallet account 142 by logging onto a payment processing system website (not shown), using a digital wallet application module 111 on the user device 110, or by using any other suitable user interface system.

In block 330, the payment processing system 140 creates a user login name and password. For example, based on the requested user name and password from the user 101, the payment processing system 140 establishes a user name for the user and a password for the user so that the user may access the user's digital wallet account 142 via a website (not shown) of the payment processing system. In certain example embodiments, the payment processing system 140 associates the user name and password with the digital wallet application module 111 and, for example, stores the user name and password on the data storage unit 114 of the user device 110.

Figure 4:
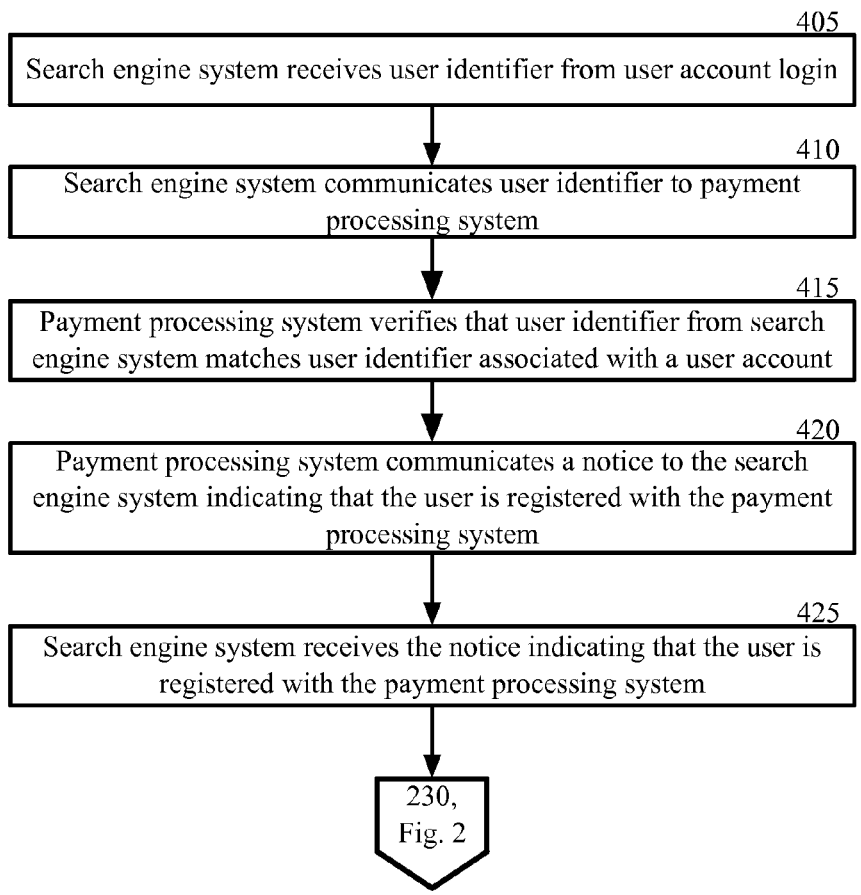
FIG. 4 is a block flow diagram depicting a method for determining whether a user is registered with a payment processing system, in accordance with certain example embodiments, as referenced in block 225 of FIG. 2.

FIG. 4 is a block flow diagram depicting a method for determining whether a user is registered with a payment processing system, in accordance with certain example embodiments, as referenced in block 225 of FIG. 2.

With reference to FIGS. 1 and 2, in block 405 of method 225, the search engine system 170 receives user identifier from user account login. For example, when the user logs in to the digital wallet account 142 of the user 101, the digital wallet application module 111 communicates the unique user identifier to the search engine system 170. In certain example embodiments, the search engine system can store the unique user identifier in the data storage unit 171 of the search engine system 170.

In block 410, the search engine system 170 communicates unique user identifier to payment processing system 140. For example, the search engine system 170 retrieves the unique user identifier from the data storage unit 171 of the search engine system 170. The search engine system 170 then communicates the unique user identifier to the payment processing system 140 via the network 105. The payment processing system 140 then receives the unique user identifier.

In block 415, the payment processing system 140 verifies that the unique user identifier received from search engine system 170 matches the unique user identifier associated with the digital wallet account 142 of the user 101. For example, the payment processing system 140 compares the unique user identifier received from the search engine system 170 with the unique user identifier associated with the digital wallet account 142 of the user 101. If there is no match, the method follows to block 235 described above.

In block 420, the payment processing system 140 communicates a notice to the search engine system indicating that the user 101 is registered with the payment processing system 140. For example, if the payment processing system 140 verifies that the unique user identifier received from search engine system 170 matches the unique user identifier associated with the digital wallet account 142, the payment process determines that the user 101 is a registered user with the payment processing system 140. Based on this determination, the payment processing system 140 communicates a notice to the search engine system 170 via the network 105 confirming that the user 101 is in fact a registered user.

In block 425, the search engine system 170 receives the notice indicating that the user 101 is registered with the payment processing system. For example, after the payment processing system 140 communicates the notice that the user 101 is a registered user, the search engine system 170 receives that notice. The notice, for example, can be any type of communication that operates to inform the search engine system that the user 101 is a registered user.

Figure 5:
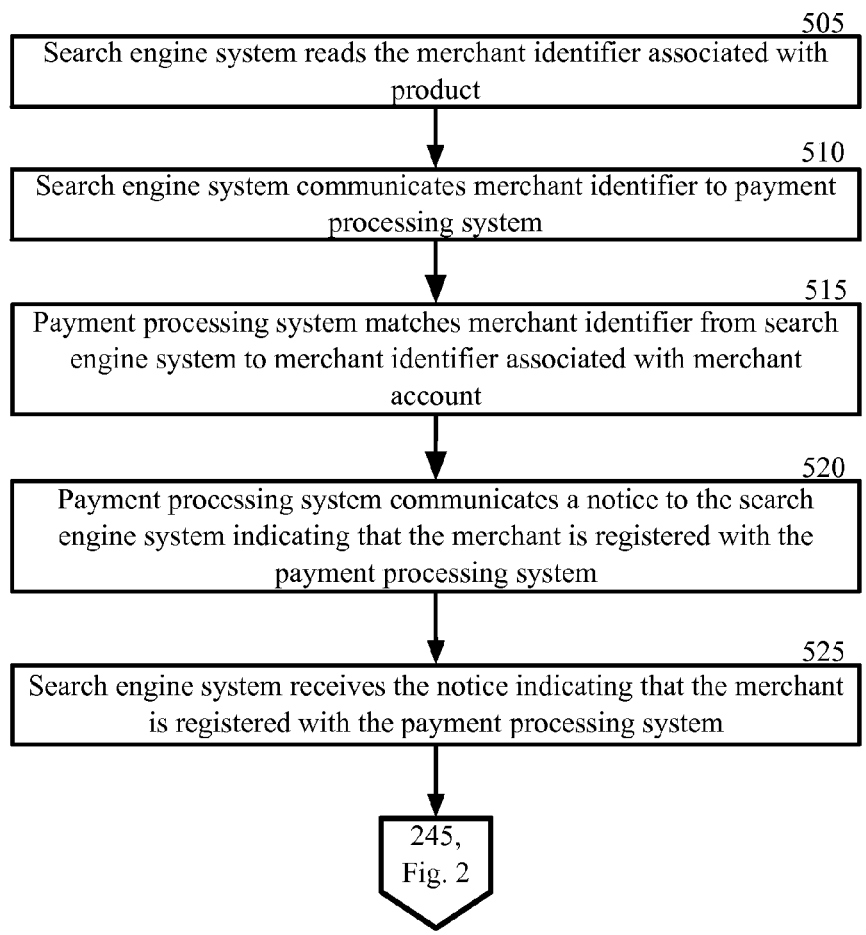
FIG. 5 is a block flow diagram depicting a method for determining if a merchant is registered, in accordance with certain example embodiments, as referenced in block 240 of FIG. 2.

FIG. 5 is a block flow diagram depicting a method for determining if a merchant is registered, in accordance with certain example embodiments, as referenced in block 240 of FIG. 2.

With reference to FIGS. 1 and 2, in block 505 of method 240, the search engine system 170 reads the merchant identifier associated with product. For example, after the search engine system 170 locates a product from the search results matching the search query of the user 101, the search engine system 170 determines whether a unique merchant identifier is associated with the product. If so, the search engine system 170 reads or determines the merchant identifier. In certain embodiments, the search engine system may associate the merchant identifier with the product based on the registration information received from the merchant system 130, for example. In certain example embodiments, the merchant identifier associated with the product is stored in the data storage unit 171 of the search engine system 170.

In block 510, the search engine system 170 communicates the unique merchant identifier to payment processing system 140. For example, the search engine system 140 communicates the unique merchant identifier to payment processing system 140 via the network 105.

In block 515, the payment processing system matches merchant identifier from search engine system 170 to merchant identifier associated with merchant account 143. For example, the payment processing system 140 compares the merchant identifier from search engine system 170 with the merchant identifier stored with merchant account 143 to determine if the identifiers are the same (i.e., a match). If so, the payment processing system 140 determines that the merchant system 130 is a registered merchant system 130.

In block 520, the payment processing system 140 communicates a notice to the search engine system 170 indicating that the merchant system 130 is registered with the payment processing system 140. For example, based on the determination of the payment processing system 140 that the merchant identifier from search engine system 170 matches the merchant identifier associated with merchant account, the payment processing system 140 communicates a notice to the search engine system 170 via the network 105 confirming that the merchant system 130 is in fact a registered merchant system.

In block 525, the search engine system 170 receives the notice from the payment processing system 140 indicating that the merchant is registered with the payment processing system 140. For example, after the payment processing system 140 communicates the notice that the user 101 is a registered user, the search engine system 170 receives that notice. The notice, for example, can be any type of communication that operates to inform the search engine system 170 that the merchant system 130 is a registered merchant system.

Figure 6:
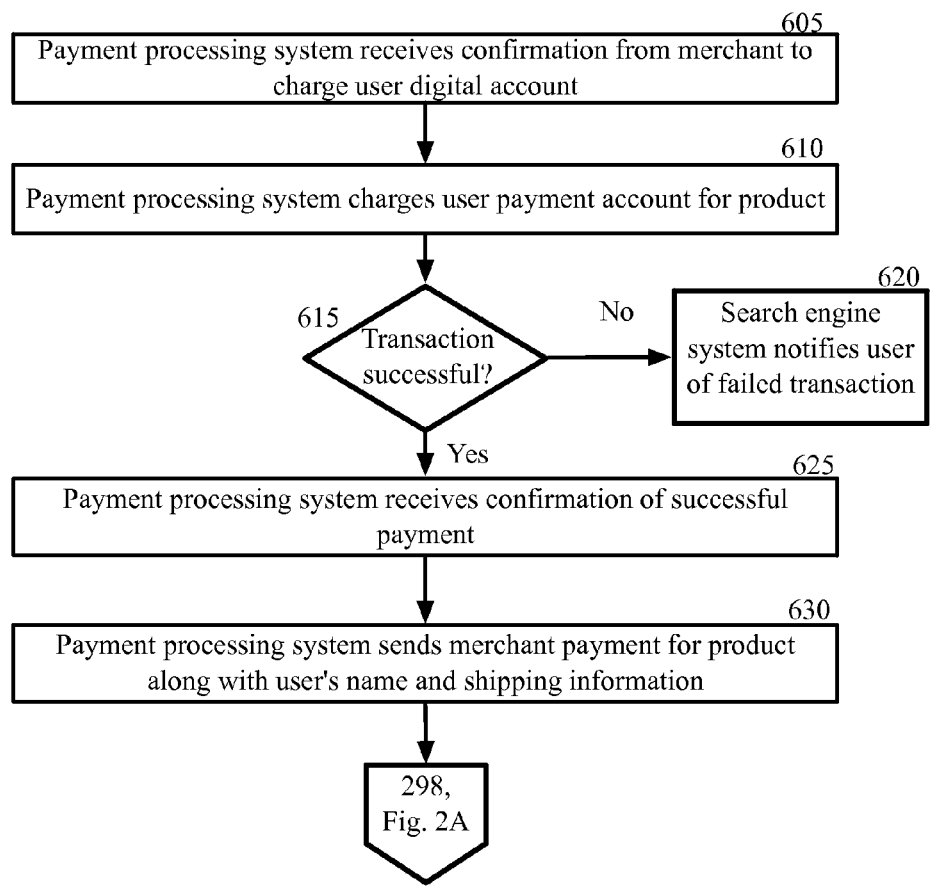
FIG. 6 is a block flow diagram depicting a method for facilitating merchant payment, in accordance with certain example embodiments, as referenced in block 297 of FIG. 2A.

FIG. 6 is a block flow diagram depicting a method for facilitating merchant payment, in accordance with certain example embodiments, as referenced in block 297 of FIG. 2A.

With reference to FIGS. 1 and 2, in block 605 of method 297, the payment processing system 140 receives confirmation from merchant system 130 to charge user digital wallet account 142. For example, after the merchant system 130 receives the user identifier and unique product identifier from the search engine system 170 as described about with reference to block 280, the merchant system 130 reads the unique product identifier to identify the product. The merchant system 130 then verifies it 130 has the product, for example, in stock. The merchant system 130 then communicates a confirmation notice to the payment processing system 140 that the payment processing system 140 can charge a payment account associated with the digital wallet account 142 of the user.

In certain example embodiments, if the merchant system 130 does not have the product matching the unique product identifier, the merchant system 130 notifies the payment processing system 140 via the network 105 that is does not have the product. The method then follows directly to block 620, wherein the search engine system 170 notifies the user 101 of the failed transaction. Additionally or alternatively, the merchant system 130 may notify the search engine system 170 directly that it does not have the product, for example, in stock, in which case the search engine system 170 notifies the user 101 of the failed transaction as described below with reference to block 620.

In block 610, the payment processing system 140 charges user payment account for the product. For example, based on the rules that the user 101 may have established during the registration of the digital wallet account 142 of the user 101, the payment processing system 140 contacts the issuer of the appropriate payment account. The payment processing system 140 then, according to any rules established between the user 101 and the payment account issuer, requests payment for the product from the payment account issuer.

If the payment processing system 140 successfully charges the user payment account for the product, the method follows the "YES" branch of block 515 to block 625. If the payment processing system 140 does not successfully charge the user payment account for the product, the method follows the "NO" branch of block 515 to block 620.

In block 620, the search engine system 170 notifies the user of the failed payment transaction. For example, if the payment processing system 140 determines that the payment account transaction was unsuccessful, the payment processing system 140 notifies the search engine system that the payment account transaction was not successful. Similarly, if the payment system 140 receives notice from the merchant system 130 that is does not have the product, for example, in stock, the payment processing system notifies the search engine system that the transaction was not successful. The search engine system may also receive a communication directly from the merchant system 130 that the merchant system 130 does not, for example, have the product in stock.

Based on a communication that the payment account transaction was unsuccessful or that the merchant system 130 doe not, for example, have the product in stock, the search engine system 170 notifies the user of the failed payment transaction. For example, in certain embodiments the search engine system may transition the direct purchase control button described above to an "unsuccessful," "purchase failed," or any other button that communicates to the user 101 that the attempted direct purchase option was unsuccessful. For example, by clicking on the "unsuccessful" button on the user interface of the user device 110, the user may, in certain embodiments, be able to access details regarding the failed direct purchase attempt, such as that the product was not available or that the attempt to charge the payment account of the digital wallet account failed. In certain other embodiments, the search engine system 170 may provide the user 101 via a user interface on the user device 110 a control button that allows the user 101 to re-try the direct purchase option, such as a "re-try" or "try again" button. For example, the user 101 may desire to access the user's digital wallet account 142 to update the user's payment account information. If the user 101 selects the re-try option, for example, the method follows to block 225. Additionally or alternatively, the payment processing system 140 may, based on information in the digital wallet account 142 of the user 101, communicate to the user 101 via the user device 110 that an unsuccessful attempt was made to directly purchase a product using the digital wallet account 142 of the user 101.

In block 625, the payment processing system 140 receives confirmation of successful payment. That is, once the payment processing system 140 successfully charges the payment account associated with the digital wallet account 142 of the user 101, the issuer of the payment account, for example, provides the payment processing system 140 with confirmation that of the successful payment. For example, the issuer of the payment account may provide a receipt to the payment processing system.

In block 630, the payment processing system 140 sends the merchant system 130 payment for product along with user's name and shipping information. For example, depending on the payment rules established by the merchant system 130 and/or the payment processing system 140, the payment processing system may wire payment to financial institution of the merchant system 130 or otherwise effectuate payment of the merchant system 130.

Alternatively, the payment processing system may facilitate payment of the merchant system by providing the payment account of the user 101 to the merchant system 130. For example, once the payment processing system 140 receives confirmation from the merchant system 130 to charge the digital account 142 of the user as described above with reference to block 605, the payment processing system 140 can communicate the payment account information to the merchant system. The merchant system can then charge the payment account of the user 101 directly. If the payment transaction is successful, the merchant system 130 receives notice of the successful transaction from the issuer of the payment account. The merchant system 130 then notifies the payment processing system 140 of the successful transaction. If the payment transaction is not successful, the method follows directly to block 620.

Other Example Embodiments

Figure 7:
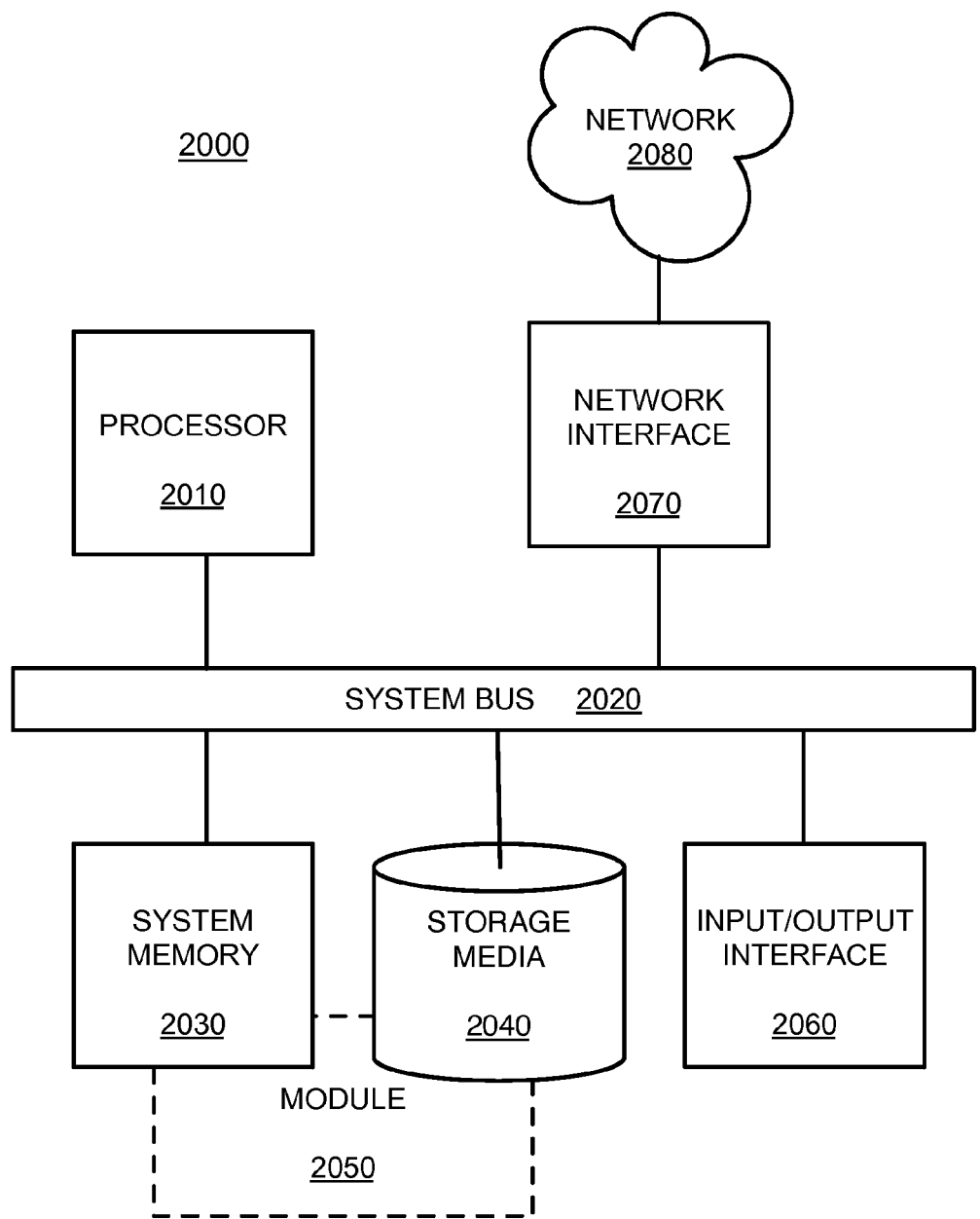
FIG. 7 is a block flow diagram depicting a computing machine and a module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for direct purchasing, comprising:

receiving, using one or more computing devices, a search query for a product from a user computing device associated with a user;

identifying, using the one or more computing devices, a product that matches the search query, wherein the product is associated with a merchant;

determining, using the one or more computing devices, that the user is a registered user of a payment processing system and that the merchant is a registered merchant of the payment processing system;

associating, using the one or more computing devices and in response to determining that the user is a registered user of the payment processing system and that the merchant is a registered merchant of the payment processing system, a unique product result identifier with a direct purchase option control for the identified product;

providing for display to the user computing device, using the one or more computing devices, the direct purchase option control associated with the unique product result identifier on the user computing device, the direct purchase option control being provided on a search results screen comprising information regarding the identified product;

receiving, using the one or more computing devices, an input from the user computing device of a selection on the user computing device of the direct purchase option control for the product; and, automatically completing, using the one or more computing devices, a purchase of the product on behalf of the user in response to receiving the input from the user computing device of the selection on the user computing device of the direct purchase option control for the product.

2. The method of claim 1, wherein automatically completing the purchase of the product on behalf of the user comprises:

communicating, using the one or more computing devices and to the payment processing system, a user identifier for an account of the user maintained by the payment processing system and the unique product result identifier;

communicating, using the one or more computing devices and to a merchant computing system operated by the merchant, the user identifier for the account of the user maintained by the payment processing system and the unique product result identifier; and, determining, by the payment processing system, that the user identifier and the unique product result identifier received from the one or more computing devices matches the user identifier and the unique product result identifier received by the payment processing system from the merchant computing system.

3. The method of claim 2, wherein automatically completing the purchase of the product on behalf of the user further comprises:

initiating, by the payment processing system, a financial transaction for a purchase amount of the product with a financial account associated with the account of the user maintained by the payment processing system;

receiving, by the payment processing system, a confirmation that the financial transaction was successful; and, providing, by the payment processing system, payment to the merchant associated with the merchant computing system based on the successful financial transaction.

4. The method of claim 2, wherein automatically completing the purchase of the product on behalf of the user further comprises:

communicating, by the payment processing system, financial account information associated with the account of the user maintained by the payment processing system to the merchant computing system for the merchant computing system to conduct a financial transaction to pay for the product; and, receiving, by the payment processing system and from the merchant computing system, a confirmation that the financial transaction was successful.

5. The method of claim 2, wherein automatically completing the purchase of the product on behalf of the user further comprises communicating, by the payment processing system and to the merchant computing system, shipping address information associated with the account of the user maintained by the payment processing system.

6. The method of claim 1, wherein the direct purchase option control comprises a direct option for the user to select a product attribute for the product, and wherein the step of automatically completing the purchase of the product on behalf of the user is performed further in response to receiving an input from the user computing device of the selection on the user computing device of the product attribute.

7. The method of claim 6, wherein the product attribute is one or more of a product size, shape, color, pattern, fit, and material.

8. A computer-implemented method for direct purchasing, comprising:

receiving, using one or more computing devices, a search query for a product from a computing device associated with a user;

identifying, using the one or more computing devices, a first product and a second product that matches the search query, wherein the first product is available from a first merchant and the second product is available from a second merchant;

determining, using the one or more computing devices, that the user is a registered user of a payment processing system and that first merchant and the second merchant are registered merchants of the payment processing system;

associating, using the one or more computing devices and in response to determining that the user is a registered user of the payment processing system and that first merchant is a registered merchant of the payment processing system, a first unique product result identifier with a direct purchase option control for the first identified product;

associating, using the one or more computing devices and in response to determining that the user is a registered user of the payment processing system and that second merchant is a registered merchant of the payment processing system, a second unique product result identifier with a direct purchase option control for the second identified product;

presenting, using the one or more computing devices, the first direct purchase option control associated with the first unique product result identifier and the second direct purchase option control associated with the second unique product result identifier on the user computing device, the first and second direct purchase option controls being presented on a search results screen comprising information regarding the first and second identified products;

receiving, using the one or more computing devices, an input from the user computing device of a selection on the user computing device of the first direct purchase option control for the first product; and, automatically completing, using the one or more computing devices, a purchase of the first product on behalf of the user in response to receiving the input from the user computing device of the selection on the user computing device of the first direct purchase option control for the first product.

9. The method of claim 8, wherein the first merchant and the second merchant are different merchants.

10. The method of claim 8, wherein the first and second products are available from the same merchant.

11. A system to provide direct purchases, comprising:

a storage device;

a processor communicatively coupled to the storage device, wherein the processor executes application code instructions that are stored in the storage device to cause the system to:

receive a search query for a product from a computing device associated with a user;

identify a first product and a second product that matches the search query, wherein the first product is available from a first merchant and the second product is available from a second merchant;

determine that the user is a registered user of a payment processing system and that first merchant and the second merchant are registered merchants of the payment processing system;

associate, in response to determining that the user is a registered user of the payment processing system and that first merchant is a registered merchant of the payment processing system, a first unique product result identifier with a direct purchase option control for the first identified product;

associate, in response to determining that the user is a registered user of the payment processing system and that second merchant is a registered merchant of the payment processing system, a second unique product result identifier with a direct purchase option control for the second identified product;

present the first direct purchase option control associated with the first unique product result identifier and the second direct purchase option control associated with the second unique product result identifier on the user computing device, the first and second direct purchase option controls being presented on a search results screen comprising information regarding the first and second identified products;

receive an input from the user computing device of a selection on the user computing device of the first direct purchase option control for the first product; and, automatically complete a purchase of the first product on behalf of the user in response to receiving the input from the user computing device of the selection on the user computing device of the first direct purchase option control for the first product.

12. The system of claim 11, wherein the first merchant and the second merchant are different merchants.

13. The system of claim 11, wherein the first and second products are available from the same merchant.

14. A computer program product, comprising:
a non-transitory computer-readable storage device having computer-readable program instructions embodied thereon that when executed by a computer cause the computer to provide direct purchases, the computer-executable program instructions comprising:
  computer program instructions to receive a search query for a product from a computing device associated with a user;
  computer program instructions to identify a product that matches the search query, wherein the product is associated with a merchant;
  computer program instructions to determine that the user is a registered user of a payment processing system and that the merchant is a registered merchant of the payment processing system;
  computer program instructions to associate, in response to determining that the user is a registered user of the payment processing system and that the merchant is a registered merchant of the payment processing system, a unique product result identifier with a direct purchase option control for the identified product;
  computer program instructions to present the direct purchase option control associated with the unique product result identifier on the user computing device, the direct purchase option control being presented on a search results screen comprising information regarding the identified product;
  computer program instructions to receive an input from the user computing device of a selection on the user computing device of the direct purchase option control for the product; and,
  computer program instructions to automatically complete a purchase of the product on behalf of the user in response to receiving the input from the user computing device of the selection on the user computing device of the direct purchase option control for the product.

15. The computer program product of claim 14, wherein automatically completing the purchase of the product on behalf of the user comprises:
  communicating, to the payment processing system, a user identifier for an account of the user maintained by the payment processing system and the unique product result identifier;
  communicating, to a merchant computing system operated by the merchant, the user identifier for the account of the user maintained by the payment processing system and the unique product result identifier; and,
  determining, by the payment processing system, that the user identifier and the unique product result identifier received from the one or more computing devices matches the user identifier and the unique product result identifier received by the payment processing system from the merchant computing system.

16. The computer program product of claim 15, wherein automatically completing the purchase of the product on behalf of the user further comprises:
  initiating, by the payment processing system, a financial transaction for a purchase amount of the product with a financial account associated with the account of the user maintained by the payment processing system;
  receiving, by the payment processing system, a confirmation that the financial transaction was successful; and,
  providing, by the payment processing system, payment to the merchant associated with the merchant computing system based on the successful financial transaction.

17. The computer program product of claim 15, wherein automatically completing the purchase of the product on behalf of the user further comprises:
  communicating, by the payment processing system, financial account information associated with the account of the user maintained by the payment processing system to the merchant computing system for the merchant computing system to conduct a financial transaction to pay for the product; and,
  receiving, by the payment processing system and from the merchant computing system, a confirmation that the financial transaction was successful.

18. The computer program product of claim 15, wherein automatically completing the purchase of the product on behalf of the user further comprises communicating, by the payment processing system and to the merchant computing system, shipping address information associated with the account of the user maintained by the payment processing system.

19. The computer program product of claim 14, wherein the direct purchase option control comprises a direct option for the user to select a product attribute for the product, and
  wherein the step of automatically completing the purchase of the product on behalf of the user is performed further in response to receiving an input from the user computing device of the selection on the user computing device of the product attribute.

20. The computer program product of claim 19, wherein the product attribute is one or more of a product size, shape, color, pattern, fit, and material.

21. The method of claim 8, wherein the direct purchase option control for the first identified product or the direct purchase option control for the second identified product comprises a direct option for the user to select a product attribute for the first identified product or the second identified product, respectively.

22. The method of claim 21, wherein the product attribute is one or more of a product size, shape, color, pattern, fit, and material.

* * * * *